No. 747,954. PATENTED DEC. 29, 1903.
W. T. EDWARDS.
CATTLE STANCHION.
APPLICATION FILED APR. 20, 1903.
NO MODEL. 2 SHEETS—SHEET 2.
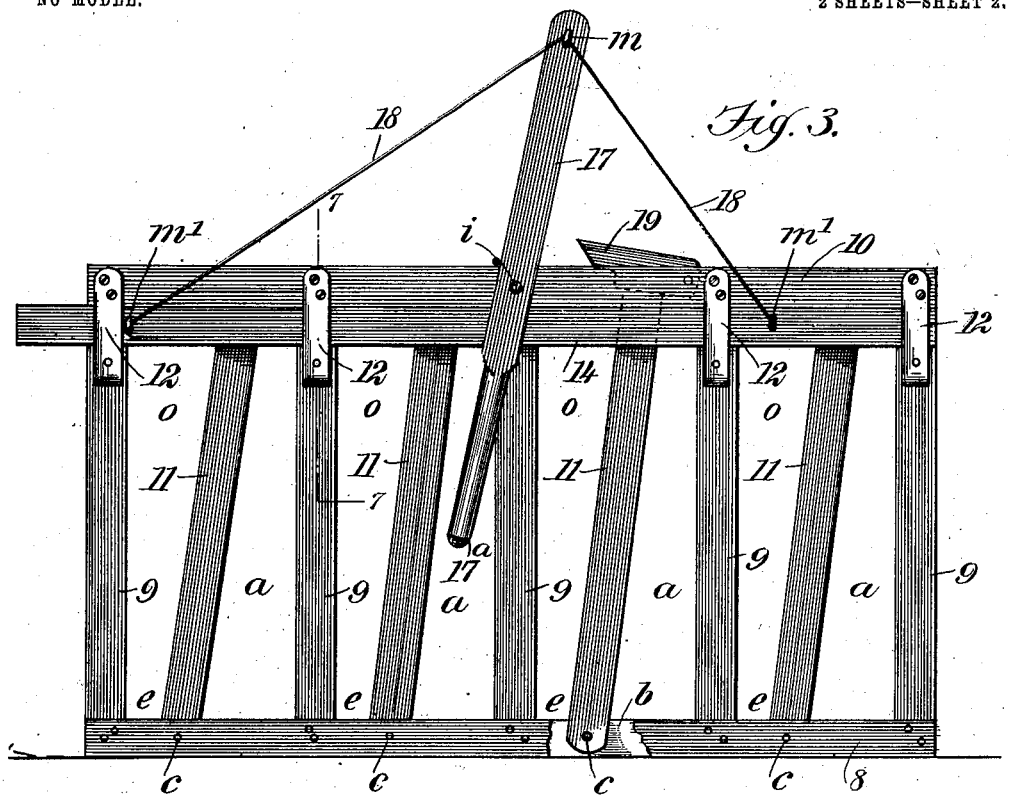
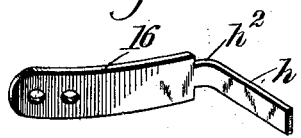
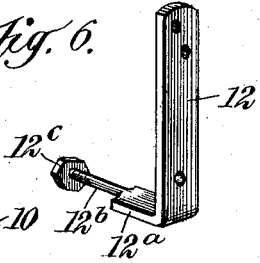
WITNESSES:
J. F. Pattison
Wm. P. Patton
INVENTOR
William Thomas Edwards
BY
ATTORNEYS.

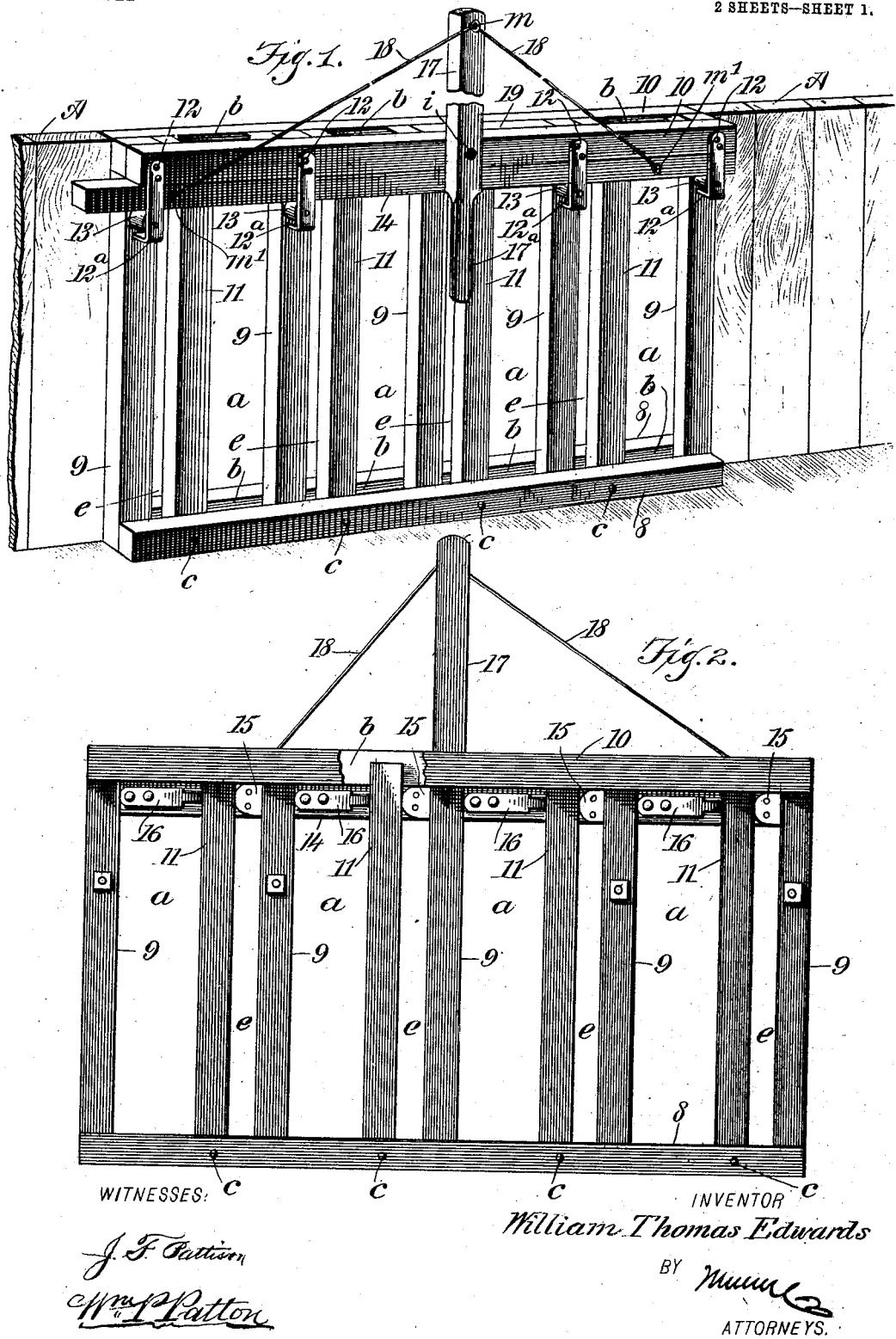

No. 747,954. Patented December 29, 1903.

UNITED STATES PATENT OFFICE.

WILLIAM THOMAS EDWARDS, OF ELKHORN, WISCONSIN.

CATTLE-STANCHION.

SPECIFICATION forming part of Letters Patent No. 747,954, dated December 29, 1903.

Application filed April 20, 1903. Serial No. 153,456. (No model.)

*To all whom it may concern:*

Be it known that I, WILLIAM THOMAS EDWARDS, a citizen of the United States, and a resident of Elkhorn, in the county of Walworth and State of Wisconsin, have invented a new and Improved Cattle-Stanchion, of which the following is a full, clear, and exact description.

This invention relates to stanchions employed for holding cattle while milking or for other purposes, which require a certain number of cattle to be separated from a herd and held spaced apart by an engagement of their heads and necks with parts of the stanchions, and has for its object to provide novel details of construction for a cattle-stanchion which adapt the device for holding a number of cattle by their necks and permit their release either individually or all at a time, as may be desired.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a front perspective view of the improved stanchion positioned at an opening in an inclosure and arranged to hold cattle by their necks. Fig. 2 is an inner side view of the improved stanchion adjusted to hold cattle. Fig. 3 is an outer side elevation of the stanchion, showing the parts adjusted for the release of cattle that may have been held therein. Fig. 4 is a plan view of the stanchion in closed adjustment. Fig. 5 is an enlarged perspective view of one of a series of resilient abutment-arms employed in connection with the stanchion. Fig. 6 is an enlarged perspective view of one of a number of hanger-bars employed, and Fig. 7 is a transverse sectional view substantially on the line 7 7 in Fig. 3.

The stanchion in complete form may be placed at an opening in the fence of an inclosure and be of any length desired to accommodate any number of cattle to be held temporarily therein. As shown to illustrate the construction and operation of the improvement, means for loosely receiving and holding four animals is provided, said means consisting of the following details:

Assuming that the opening in the upright wall or fence A that is a part of an inclosure is of a suitable width to accommodate the improved stanchion, two substantial base-rails 8 8 are extended across said opening, so as to span it. The base-rails 8 are of similar dimensions and may with advantage be of wood, rectangular in cross-section, said base-rails being spaced apart in parallel planes by a series of vertical posts 9 of equal height and firmly secured at even distances apart by the insertion and fixture of their lower ends between the base-rails. As shown, two of the posts 9 are erected at opposite ends of the base-rails 8, one of said posts at the longitudinal center of the rails and the remaining two posts located an equal distance between the central post and a respective end post, whereby spaces $a$ of equal width intervene the posts. At the upper ends of the vertical posts 9 two top rails 10 10 are oppositely secured thereon by any preferred means, these top rails preferably having a like form and dimensions to that of the base-rails 8. Between the paired top and bottom rails 8 and 10 the spaces $a$ that intervene the fixed post 9 are extended, thus forming slots $b$, and in said slots stanchion-bars 11 are introduced. Each stanchion-bar 11 is pivoted at its lower end at $c$ in a slot $b$ at a suitable distance from a respective stationary post 9, which permits the upper portion of the stanchion-bar to rock in the slot $b$ directly above the one wherein the lower end of said bar is pivoted.

Upon one of the top rails 10 a plurality of hanger-bars 12 are affixed by their upper ends. As shown, there are four of these hanger-bars, each positioned opposite one of the posts 9. The hanger-bars 12 are each bent at a right angle near the lower end thereof, providing a lateral member $12^a$, from which projects an integral bolt $12^b$, threaded for the reception of a nut $12^c$, as is clearly shown in Fig. 6. The bolt extensions $12^b$ are each inserted through a transverse hole formed in the posts 9 at a suitable distance below the rail 10, from which the hanger-bars depend, and, as indicated in Fig. 7, a proper adjustment of the nut $12^c$ on the projecting end of the bolt extension will draw the end of the lateral member on the bar into close contact with the post 9, thus affording a transverse opening $d$ of rectangular form between the post, the depending portion of the hanger-bar, and the lower side of the top rail 10, from which the series of hanger-bars project downward. In each opening $d$ a small roller 13 is pivoted upon the pendent portion of the hanger-bar 12, leaving a space above the roller, and through these spaces a pusher-bar 14 is inserted and is slidably supported by the series of rollers 13.

A plurality of blocks 15 are secured upon the pusher-bar 14 on the side opposite the one that contacts with the hanger-bars 12. These blocks, which may contact with the stationary posts 9, have proper length to space the upper ends of the rockable stanchion-bars from the posts 9 equal distances of such a degree that when the stanchion-bars impinge upon the stop-blocks said bars will be upright and have their sides that engage the spacing stop-blocks 15 disposed parallel with the opposite sides of respective posts, as shown in Fig. 2, providing equal spaces $e$ between the respective posts and stanchion-bars. It will be seen that when the posts 9 and stanchions 11 are all arranged in parallel planes by the impinge of the upper portions of the stanchion-bars at like side edges thereof against the preferably convex ends of the stop-blocks 15 spaces $a$, that are preferably wider than the spaces $e$, are afforded between the remaining side edges of the posts and stanchion-bars.

Upon the side of the pusher-bar 14 whereon the stop-blocks 15 are secured and separated therefrom by the bars 11 a series of abutment-arms 16 is secured. Each of the similar arms 16 consists of a strip of resilient plate metal bent near one end, so as to provide a guide-limb $h$ thereon and afford a rounded corner $h^2$ where the bend is made, as is clearly shown in Figs. 4 and 5. Each arm 16 is secured near its flat end upon the pusher-bar 14, thus disposing said end adjacent to the edge of the post 9 from which the resilient arm projects toward the nearest stanchion-bar 11, and it will be seen in Fig. 4 that the limbs $h$ of the arms are loosely inserted through respective transverse slots $h'$, formed in the pusher-bar 14. The transverse slots $h'$ are so relatively positioned that the limbs $h$ on the resilient arm 16 will loosely contact with the edges of the stanchion-bars 11 when the latter are rocked into contact with the stop-blocks 15 and, as shown in Fig. 4, the arms 16 normally trend outward on an incline from their fixed flat ends to the rounded corner $h^2$ thereon, from which the limbs $h$ project into the slots $h'$.

Upon the same side of the top rail 10 from which the hanger-bars 12 depend a shifting lever 17 is pivoted between its ends, as indicated at $i$ in Figs. 1 and 3, the lever having its depending portion shaped to adapt it to serve as a handle $17^a$. A flexible connection 18 of any suitable material is affixed between its ends upon a staple or eyebolt $m$, which projects from the side of the shifting lever 17 near its upper end. From the eyebolt $m$ the flexible connection 18 is extended downward and oppositely toward the ends of the pusher-bar 14, from which project eyebolts $m'$, whereon the ends of the flexible connection are secured.

A latch-hook 19 is pivoted in one of the openings $b$ between the top rails 10, and said latch-hook is adapted to interlock with the upper end of one of the stanchion-bars 11 if the latch-hook is manually depressed when the stanchion-bars are upright, and it will be seen that when the latch-hook 19 is rocked away from the stanchion-bar a rocking movement of the lever 17 will slide the pusher-bar 14 and correspondingly rock the stanchion-bars toward or from the fixed posts 9, thus facilitating the provision of openings $o$ for the reception of the heads and necks of the animals between the upper portions of the inclined stanchion-bars and the posts. After the heads of the animals are fully inserted through the spaces $o$ the lever 17 is rocked in an opposite direction, which will correspondingly slide the pusher-bar 14 and dispose the stanchion-bars 11 upright, thus contracting the spaces $o$ to the normal width, (indicated at $e$,) so that a withdrawal of the heads of the animals is prevented, and the stanchion may be retained in closed adjustment as long as desired by depression of the latch-hook 19.

If at any time it is desired to release one or more animals and hold the others in the stanchion, this may be readily effected by a manual depression of appropriate spring-arms 16 and a simultaneous rocking movement of the stanchion-bars that are released by depression of the abutment-arms and are rocked above said arms, while the pusher-bar 14 is held from sliding by the latch-hook 19.

It will be seen that by the construction and arrangement of details of the improved stanchion it may be adjusted to provide openings to receive the heads and necks of cattle throughout the length of the stanchion by a single rocking movement of the lever 17 and by an opposite rocking movement of the lever close the stanchion upon the necks of the animals, this adjustment permitting a locking adjustment of the latch-hook 19 for retention of the animals as long as is desired. Furthermore, it will be seen that any one or more of the animals may be readily released by a manual adjustment of appropriate abutment-arms 16 and the stanchion-bars upon which they impinge.

Having described my invention, I claim as new and desire to secure by Letters Patent—

1. The combination with a top support and a bottom support, a series of spaced upright posts secured by their ends upon said supports, and a series of stanchion-bars held between pairs of the posts and pivoted near their lower ends on the bottom support, of a series of L-shaped hanger-bars pendent from the top support and secured by their lateral lower members upon the upper portions of a plurality of the posts, rollers carried by the hanger-bars, a pusher-bar slidable upon the rollers, means for controlling the rocking movement of the upper ends of the stanchion-bars, which means is actuated by the reciprocal pusher-bar, and means for reciprocating said pusher-bar.

2. In a device of the character described, the combination with the slidably-supported pusher-bar, of the series of similar-spaced abutment-arms, each arm consisting of a strip of resilient plate metal bent to provide a lateral limb thereon near one end, said limb passing loosely through a transverse slot in the pusher-bar, the opposite end of each abutment-arm being secured upon the pusher-bar, so that the abutment-arm normally inclines outward toward its free end, thus adapting the lateral limb thereon to produce an abutment.

In testimony whereof I have signed my name to this specification in the presence of two subscribing witnesses.

WILLIAM THOMAS EDWARDS.

Witnesses:
    JAY F. LYON,
    JOS. H. WEBSTER.